(No Model.)
C. WOOD.
GIG MILL.
No. 434,223. Patented Aug. 12, 1890.
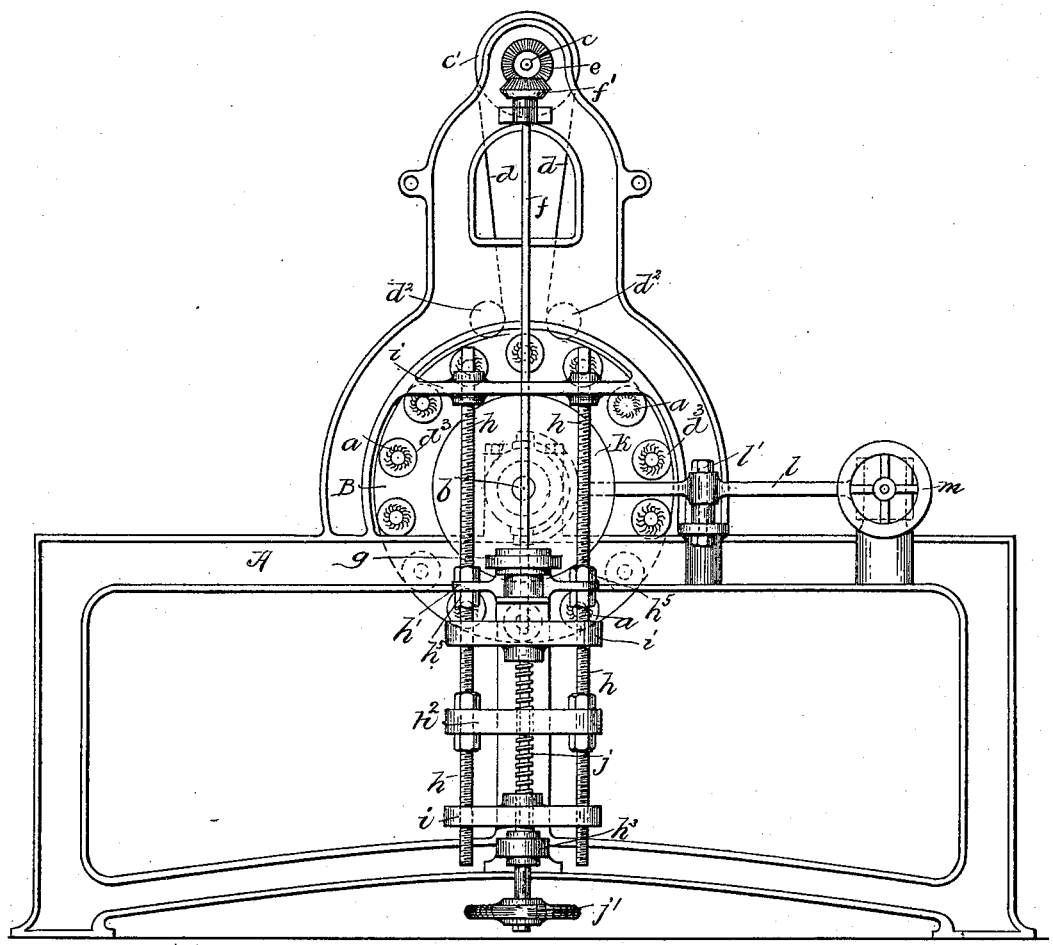
Witnesses,
Edgar A. Goddin
Frederick L. Emery
Inventor,
Charles Wood,
by Crosby & Gregory
attys

UNITED STATES PATENT OFFICE.

CHARLES WOOD, OF CLINTON, ASSIGNOR OF TWO-THIRDS TO GEORGE HILL, OF NEWTON, MASSACHUSETTS.

GIG-MILL.

SPECIFICATION forming part of Letters Patent No. 434,223, dated August 12, 1890.

Application filed March 12, 1890. Serial No. 343,635. (No model.) Patented in England May 31, 1887, No. 7,844, and in France May 26, 1888, No. 189,587.

*To all whom it may concern:*

Be it known that I, CHARLES WOOD, a subject of the Queen of Great Britain, but at present residing in Clinton, county of Worcester, State of Massachusetts, have invented an Improvement in Gig-Mills Employed in Finishing Woven Fabrics, of which the following description, in connection with the accompanying drawing, is a specification, like letters on the drawing representing like parts, the said invention having been patented in England on the 31st day of May, 1887, No. 7,844, and in France May 26, 1888, No. 189,587.

The machine herein to be described consists, essentially, of a cylinder having a series of so-called "raising-rollers" provided with card-clothing, the said rollers being rotated about their own centers while the cylinder itself is being rotated; or, in other words, the said rollers have a planetary motion and act in succession upon the cloth to be finished.

My improvements in this class of machines consist, essentially, in the employment of frictional gearing between the shaft of the main cylinder and a counter-shaft employed to set in motion the devices which rotate the raising-rollers, such employment of a frictional gearing enabling the speed of the raising-rollers to be increased or diminished quickly, as required for the peculiar work to be done or the cloth to be treated.

The drawing in side elevation shows a sufficient portion of a gig-mill or finishing-machine to enable my improvements to be understood.

The frame-work A has suitable bearings to support the shaft $b$, which carries the usual cylinder B, the cylinder in turn having mounted in suitable bearings, forming part thereof, a series of raising-rollers $a$, which rollers are to be rotated on their own axes while the cylinder B is being rotated. The shaft $b$ of the cylinder B will in practice be driven by a belt upon a pulley. (Not shown.)

The cylinder-shaft $b$, provided with a suitable feather-key or equivalent, has mounted upon it loosely a friction-disk $k$, which is adapted to be moved longitudinally upon the said shaft by means of a clutch-lever $l$, pivoted at $l'$, the inner end of the said clutch-lever being forked and having suitable rolls or studs to enter a groove in the hub of the friction-disk $k$, the outer end of the said lever $l$ being under the control of a screw having a suitable hand-wheel $m$.

In the upper part of the frame-work is a counter-shaft $c$, having a pulley $c'$ and a bevel-wheel $e$. This bevel-wheel $e$ is engaged by a bevel-wheel $f'$ at the upper end of a shaft $f$, having a feather-key and provided with a friction-roller $g$, the hub of which is grooved and held in a clip $h'$, supported on a frame consisting of the rods $h$ and cross-bar $h^2$. The rods $h$ are mounted in stationary guides $i$, and the frame is capable of adjustment vertically by means of a screw $j$, the threaded part of which enters a threaded part of the cross-bar $h^2$, the said screw being restrained against longitudinal motion by a lug or ear, as $h^3$, between suitable collars upon the screw-shaft $j$. The pulley $c'$ on the counter-shaft receives a belt $d$, which is extended under idle rolls or sheaves $d^2$ and thence over suitable pulleys $d^3$ upon the ends of the raising-rollers $a$, the said belt in its rotation rotating the raising-rollers $a$ in addition to the revolving motion which they receive when the cylinder-shaft $b$ is being rotated.

To start the counter-shaft, the clutch-lever $l$ will be moved to move the friction-disk $k$ in contact with the friction-wheel $g$, and thereafter the said friction-wheel $g$ will be rotated by the frictional contact rotating the shaft $f$. By rotating the hand-wheel $j'$ and screw $j$ the friction-roller $g$ may be moved toward or from the center of the friction-disk, so as to vary the speed of the counter-shaft $c$ and impart any required rate of speed to the raising-rollers $a$. By slackening the nuts $h^5$ on the rods $h$ the friction-roller $g$ and clip $h'$ can be moved along on the rods $h$ to the other side of the center of the disk $k$, if desired.

Prior to my invention I am not aware that adjustable frictional gearing has ever been applied for use in connection with gig-mills or machines for finishing woven fabrics; but the use of said gearing is very beneficial, as thereby the speed of the raising-rollers may be readily made more or less, according to the work to be done.

I do not desire to limit my invention to the exact devices shown for moving or adjusting the friction-wheel $g$ toward and from the center of the disk $k$.

I claim—

1. The rotating cylinder of a gig-mill, its shaft, a series of raising-rollers carried by the said cylinder, a friction-disk mounted upon the said shaft, a co-operating friction-wheel, the shaft upon which it is loosely feathered, and means to adjust the said friction-wheel toward and from the cylinder of the said friction-disk, combined with means between the said shaft upon which the friction-wheel is mounted, and the said raising-rollers to rotate the latter independently of the rotation of the cylinder carrying the said raising-rollers, to operate substantially as described.

2. The cylinder, its shaft, a series of raising-rollers mounted in the said cylinder, a friction-disk loosely feathered upon the shaft of the cylinder, a clutch-lever to move the said friction-disk, a counter-shaft having a pulley, a belt actuated by the said pulley and adapted to rotate the raising-rollers, a friction-wheel co-operating with the said friction-disk, a shaft upon which the said friction-wheel is keyed loosely, means between the said shaft and the said pulley to rotate the said belt, and means to adjust the said friction-wheel toward and from the center of the said friction-disk, substantially as described.

In testimony whereof I have signed my name to this specification in the presence of two subscribing witnesses.

CHARLES WOOD.

Witnesses:
JAS. H. CHURCHILL,
B. DEWAR.